(12) United States Patent
Lönnfors et al.

(10) Patent No.: US 6,757,722 B2
(45) Date of Patent: Jun. 29, 2004

(54) SYSTEM AND METHOD FOR PROVIDING PARTIAL PRESENCE NOTIFICATIONS

(75) Inventors: Mikko Lönnfors, Helsinki (FI); Eva-Maria Leppänen, Tampere (FI); Jose Costa-Requena, Helsinki (FI)

(73) Assignee: Nokia Corporation, Espoo (FI)

( * ) Notice: Subject to any disclaimer, the term of this patent is extended or adjusted under 35 U.S.C. 154(b) by 40 days.

(21) Appl. No.: 10/196,327

(22) Filed: Jul. 16, 2002

(65) Prior Publication Data

US 2004/0015569 A1 Jan. 22, 2004

(51) Int. Cl.[7] .............................................. G06F 15/177
(52) U.S. Cl. ..................................... 709/220; 709/203
(58) Field of Search ................................ 709/220, 221, 709/203; 379/90.01, 93.01, 106.01; 707/1

(56) References Cited

U.S. PATENT DOCUMENTS 6,286,033 B1 * 9/2001 Kishinsky et al. .......... 709/203
6,658,095 B1 * 12/2003 Yoakum et al. .......... 379/93.01

OTHER PUBLICATIONS

M. Lonnfors, "Presence Information Data format (PIDF) Extension for Partial Presence", IETF, Internet–Draft, Expires: Jul. 21, 2004, pp. 1–14, Jan. 21, 2004.*

Sugano et al., "CPIM Presence Information Data Format", draft–ietf–impp–cpim–pidf–04.txt May 2002.

Sugano et al., "CPIM Presence Information Data Format", draft–ietf–impp–cpim–pidf–05.txt May 2002.

Sugano et al., "Presence and Instant Messaging Protocol (PRIM) Server–Server Protocol Specification", (draft–ietf–prim–00.txt), Oct. 2001.

3GPP, "Technical Specification Group Services and System Aspects; Presence Service; Architecture and Functional Description", 3 GPP TR 23.841 v1.1 (Release 56), Apr. 22–26, 2002.

* cited by examiner

*Primary Examiner*—Mehmet B. Geckil

(57) ABSTRACT

A system and method for communicating partial notifications relating to a presentity's presence information. The communication may be effected between presence servers and terminals coupled to the presence servers via a network. At least one presentity is identified to which a terminal has requested presence services. A presence document is created, where the presence document includes presence information corresponding to the presentity. The presence information is configured as partial presence information comprising less than a total of the presence information available for the presentity. The presence document having the partial presence information is communicated to the terminal requesting the presence information.

32 Claims, 9 Drawing Sheets

| | | |
|---|---|---|
| VERSION<br><br>300 | USED TO IDENTIFY VERSION OF ENTIRE PRESENCE DOCUMENT AND/OR SINGLE PRESENCE TUPLE | |
| | DOCUMENT LEVEL<br><br>VERSION PARAMETER PROVIDES VERSIONING SUPPORT ACROSS DIFFERENT APPLICATION PROTOCOLS<br><br>302 | TUPLE LEVEL<br><br>VERSION PARAMETER PROVIDES INFORMATION TO WATCHER WHETHER OR NOT TUPLE IS TO BE UPDATED<br><br>304 |
| ACTION<br><br>306 | USED INSIDE TUPLE TO INDICATE ACTION CLIENT SHOULD PERFORM ON PARTICULAR TUPLE | |
| | "REMOVED"<br><br>308 | "EMPTY"<br><br>310 | OTHERS<br><br>312 |
| MODE ATTRIBUTE<br><br>314 | USED IN DOCUMENT LEVEL TO INDICATE THAT THE NOTIFICATION IS AN UPDATE OR A COMPLETE PRESENCE STATE | |

*FIG. 3*

SYSTEM AND METHOD FOR PROVIDING PARTIAL PRESENCE NOTIFICATIONS

FIELD OF THE INVENTION

This invention relates in general to communications, and more particularly to a system and method for communicating partial notifications relating to a presentity's presence information.

BACKGROUND OF THE INVENTION

Mobile and landline/wireline computing devices have in recent years become a valuable tool in day-to-day communications. Desktop computers, workstations, and other wireline computers currently allow users to communicate via e-mail, video conferencing, and instant messaging (IM) to name a few communication applications. Mobile devices, such as mobile telephones, handheld computers, personal digital assistants (PDAs), etc. also assist in day-to-day communication. Mobile/wireless telephones have conventionally served as voice communication devices, but through technological advancements have recently proved to be effective devices for communicating data, graphics, etc. Wireless and landline technologies continue to merge into a more unified communication system, as user demand for seamless communications across different platforms increases.

Many communication applications allow for real-time or near real-time communication that falls outside of the traditional voice communication associated with wireline and wireless telephone communications. Chat sessions, instant messaging, Short Message Service (SMS), video conferencing, are but a few such communication vehicles. Many of these types of communications have been well-received by the communicating public, and are expected to become increasingly popular, particularly in view of the proliferation of wireless devices and continual technological breakthroughs.

In order to implement such technologies, "presence" technology is used to determine the location, willingness to communicate, and other parameters relating to real-time or near real-time communications. Presence technology generally refers to applications and services that facilitate location and identification of one or more endpoints to such communication links. For example, if a user of a wireless, handheld device would like to initiate an IM session with another IM user, presence services may be used to present users' willingness to receive IM messages. Presence services are an integral part of third generation (3G) wireless networks, and are intended to be employed across a wide variety of communication devices.

Current presence service technology includes the concepts of presentities, presence servers, and watchers. Generally, a presentity can provide information as to its "presence" (e.g., location, willingness to communicate at a certain time or with certain users, etc.). This information can be collected and utilized by presence servers, that can notify authorized "watchers" who are interested in presence information that certain presence information is available. Watcher applications may be implemented in wireline and wireless terminals to obtain presence information from the presence servers about other users. This may come in the form of a notification, issued to the watcher by the presence server.

Conventionally, notifications to users/watchers that a targeted user/device has become available have been sent as complete presence information. In other words, there are a number of different pieces of presence information that are associated with the totality of the presence information, and original or updated notifications result in sending all of the presence information to the notification-subscribing users who are "watching" for the particular presence information. For example, in current IETF presence format specifications such as the Common Profile for Instant Messaging (CPIM) Presence Information Data Format (PIDF), all presence information is sent regardless of whether portions of the information being sent are already available to the watcher. In some environments, such as wireless environments, sending all of the presence information when only some portion of the information has changed may not be a favorable option, as the available bandwidth is typically significantly lower than in a fixed Internet environment.

Existing presence specifications do not provide any indication whether some data received earlier has become invalid. This can occur where, for example, watchers change filtering information, presentities change presence authorization levels, and presence attributes become unavailable on networks. Furthermore, the existing specifications do not provide versioning information, which is needed if presence information is delivered using multiple application protocols, because protocol-specific versioning mechanisms cannot be used in such instances.

Accordingly, there is a need in the communications industry for a more efficient and convenient manner of providing presence information. The present invention fulfills these and other needs, and offers other advantages over the prior art.

SUMMARY OF THE INVENTION

The present invention is directed to a system for communicating partial notifications relating to a presentity's presence information.

In accordance with one embodiment of the invention, a method is provided for communicating presence information between presence servers and terminals coupled to the presence servers via a network. The method includes identifying at least one presentity to which a terminal has requested presence services. A presence document is created, where the presence document includes presence information corresponding to the presentity. The presence information is configured as partial presence information comprising less than a total of the presence information available for the presentity. The presence document having the partial presence information is communicated to the terminal requesting the presence information.

In accordance with another embodiment of the invention, a method is provided for notifying client terminals of presence information. The method includes creating a presence document for use by at least one terminal requesting presence information regarding a presentity. Creating a presence document includes creating at least one tuple, wherein the tuple includes a version value indicating a version of the tuple relative to previous versions of the tuple, and associating presence information with the tuple, wherein the presence information comprises a subset of the presentity's complete set of presence information. The presence document is sent to the client terminal requesting the presence information, where the version value provided via the tuple is compared to a current version value stored on the client terminal. The client terminal is directed to update presence information associated with the tuple, if the version value provided via the tuple indicates new presence information is available for that tuple.

In accordance with another embodiment of the invention, a presence awareness system is provided. The system includes at least one terminal having a watcher application that watches for presence information corresponding to a presentity. At least one presence server is provided, which is coupled to the terminal via a network. The presence server includes a processor configured to identify at least one presentity to which the watcher application has requested presence services. Via the processor (and other computing elements), a presence document including the presence information corresponding to the presentity is provided. The presence information is configured as partial presence information having less than the total of the presence information available for the presentity. The presence document having the partial presence information is communicated to the watcher application of the terminal requesting the presence information.

In accordance with another embodiment of the invention, a presence server is provided, where the presence server is coupled to a plurality of terminals via a network. The presence server communicates presence information to one or more of the plurality of terminals via the network. The presence server includes a memory configured to store presence information for a plurality of presentities, and to store terminal subscriptions for terminals authorized to receive the presence information for one or more of the presentities. A processing system is provided with the presence server, and is configured to identify at least one presentity to which a particular terminal has subscribed, and to create a presence document including the presence information corresponding to the presentity, where the presence information is configured as partial presence information corresponding to a subset of a set of presence information available for the presentity. A data transmission module is coupled to the processing system to communicate the partial presence information via the presence document to the subscribing terminal over the network.

The above summary of the present invention is not intended to describe each illustrated embodiment or implementation of the present invention. This is the purpose of the figures and the associated discussion which follows.

BRIEF DESCRIPTION OF THE DRAWINGS

The invention is described in connection with the embodiments illustrated in the following diagrams.

FIG. 3 illustrates a representative namespace extension facilitating the use of partial notifications in accordance with the principles of the present invention;

DETAILED DESCRIPTION OF THE INVENTION

A portion of the disclosure of this patent document contains material which is subject to copyright protection. The copyright owner has no objection to the reproduction of the patent document or the patent disclosure, as it appears in the Patent and Trademark Office patent file or records, but otherwise reserves all copyrights and associated copyright ownership privileges.

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a manner for communicating presence information. Presence information is created at a presence server or associated system, where the presence information is configured as partial presence information that includes less than all of the status information relating to the presentity. In this manner, presence information that has already been transferred to a watcher application need not be unnecessarily transmitted from presence servers to client watcher applications.

A number of entities are generally implemented in a presence service architecture. A presentity is an entity that provides presence information. Another entity is a presence server, which receives presence information from presentities. A watcher is an entity that is interested in presence information. A representative embodiment of a presence service architecture is shown in FIG. 1.

Figure 1:
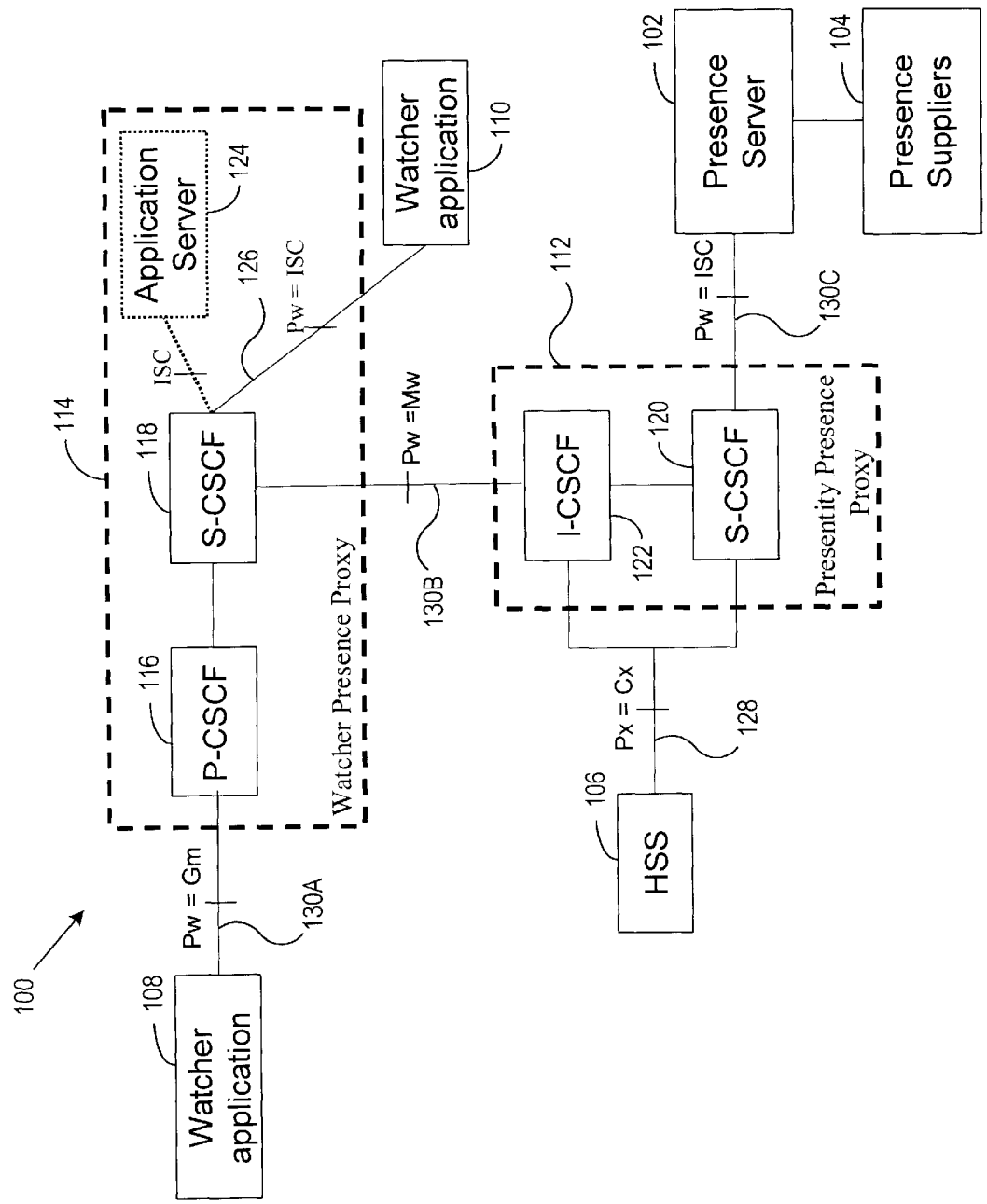
FIG. 1 is a block diagram illustrating a representative presence service system in which the principles of the present invention are applicable.

FIG. 1 is a block diagram illustrating a representative presence service system 100 in which the principles of the present invention are applicable. In the illustrated embodiment, the presence service system 100 is implemented as an IP multimedia subsystems (IMS) network, where watcher and presentity presence proxy functionalities are mapped to IMS network elements when located within the IMS.

The presence server 102 manages presence information provided by one or more presence suppliers 104, such as presence user agents and external presence agents, as well as presence information provided by the network (i.e., location information). The presence server 102 combines presence-related information for a particular presentity from the information it receives from multiple presence suppliers 104 into a single presence document, based on presence attributes and policies defined in the presence server 102. Users can then make subscription requests for presence information available at the presence server 102. As described more fully below, the users, acting as watchers, can make subscription requests for receiving the presence information available from the presentity at the presence server 102. The presentity can also make a subscription request for receiving the information about the watchers that had subscribed to its presence information in the presence server 102.

The Home Subscriber Server (HSS) 106 serves as a master database and manages information relating to the mobile subscriber, such as user profile information. The HSS 106 may support a subscription profile that identifies information for a given subscriber such as user identities, subscribed services and profiles, service-specific information, mobility management information, authorization information, and the like. The HSS 106 is analogous to the second generation (2G) Home Location Register (HLR), but also includes information such as location information that can be used to develop location-based services. Third generation (3G) HLRs are a subset of the HSS 106.

The presence service system 100 also includes watcher applications, such as watcher applications 108 and 110. Watcher applications are entities that request and/or subscribe to presence information relating to one or more presentities. When a watcher application intends to access some presence information of a presentity, it obtains the address (e.g., SIP URL) where the request is targeted, and the presence server containing this presence information can therefore be found via the network. The presentity presence proxy 112 assists in this regard, as it determines the identity of the presence server 102 associated with a particular presentity. Further, the watcher presence proxy 114 performs (among other things) address resolution and identification of target networks associated with a presentity. Other functions of the watcher presence proxy 114 and presentity presence proxy 112 depend on, for example, the relative location and trust relations of the watcher application 108 and the presence server 102.

Each of the proxies 112, 114 may include various Call State Control Function (CSCF) modules. The watcher presence proxy 114 includes a proxy CSCF (P-CSCF) 116, and a serving CSCF (S-CSCF) 118. The S-CSCF 118 performs and/or assists in performing a number of functions, including controlling sessions for the user equipment/watcher application, obtaining the address of CSCFs in the presentity presence proxy 112 and of the P-CSCF 116, forwarding SIP requests/responses to and from the presentity presence proxy 112, triggering and executing services, authentication, etc. The P-CSCF 116 serves as the point of contact for the watcher application 108, and performs and/or assists in performing functions such as translation, security, authorization, etc.

The presentity presence proxy 112 also includes an S-CSCF 120, as well as an interrogating CSCF (I-CSCF) 122. The I-CSCF 122 serves as a point of contact in the home network for connections destined to a subscriber of that home network or roaming subscribers currently located within that network's service area. The I-CSCF 122 performs a number of functions, including assigning a serving CSCF 120 to a user performing registration, contacting the HSS 106 to obtain the S-CSCF 120 address, and forwarding SIP requests/responses to the S-CSCF 120.

In the system 100 of FIG. 1, there are two alternative locations for watcher applications in an IMS network. A first watcher application 108 may be located within a User Equipment (UE) terminal registered in the network. In the illustrated embodiment, the watcher application 108 can register with the network by registering to the S-CSCF 118 via the P-CSCF 116, such as is specified in standard IMS procedures. Another watcher application 110 may be associated with an application server 124 behind an ISC interface 126 which is described more fully below. The application server 124 may be used to augment the watcher presence proxy 114 functionality, by allowing a watcher application 110 to subscribe to several presentities using a single subscription request.

The presence service system 100 includes a number of IMS interfaces, which implement the Session Initiation Protocol (SIP) in one embodiment. The IMS interfaces associated with the illustrated architecture are referred to as reference points. A reference point $P_x$, depicted on interface line 128, represents the interface between a presentity presence proxy 112 and a Home Subscriber Server (HSS) 106. This interface assists in the location of the presence server 102 of the presentity. This particular reference point $P_x$ is a $C_x$ interface, as a $C_x$ interface supports information transfer between CSCFs and the HSS 106. The HSS manages location information (among other things), and the $C_x$ interface thus supports the transfer of at least location information between the HSS 106, and the I-CSCF 122 and S-CSCF 120.

Another reference point $P_w$, depicted on interface segments 130A, 130B, and 130C, represents the interface between watcher application 108 and the presence server 102. This interface allows a watcher application to request and obtain presence information. In one embodiment of the invention, this interface is compliant with Common Profile for Instant Messaging (CPIM) specifications using the Presence Information Data Format (PIDF), and may be implemented using SIP for example. A first interface segment 130A of $P_w$ is a $G_m$ interface, which allows the watcher application 108 to communicate with the P-CSCF 116. A second interface segment 130B of $P_w$ is a $M_w$ interface, which allows CSCFs to interface with one another. The $M_w$ interface therefore facilitates communication between the S-CSCF 118 of the watcher presence proxy 114 with the I-CSCF 122 of the presentity presence proxy 112. Another interface segment 130C of $P_w$ is an IMS Service Control Interface (ISC) which is a reference point between a CSCF and a server. The ISC interface thus allows the S-CSCF 120 to communicate with the presence server 102. Alternatively, the watcher presence proxy 114 S-CSCF 118 may directly communicate with another watcher application 110 via an ISC interface 126.

When a watcher application 108 requests presence information, this can be accomplished using, for example, the CPIM PIDF interface definition. A request for information is transmitted from, for example, the watcher application 108 to the presence server 102. If the presence server 102 authorizes the subscription, presence notifications are permitted to be sent back to the watcher application 108. These notifications may be repeatedly sent to each subscribing watcher application each time the state of the presentity changes.

Figure 2:
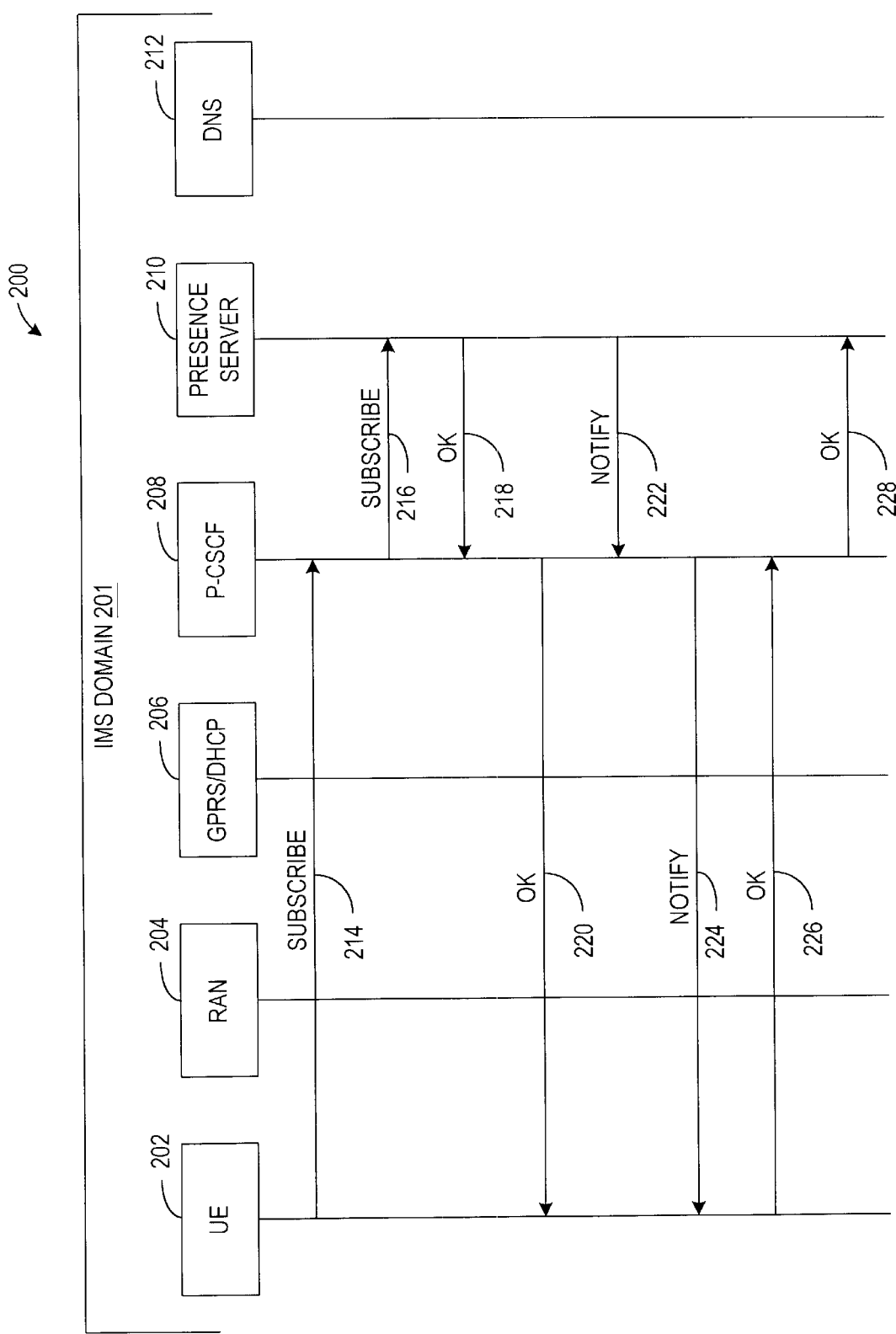
FIG. 2 illustrates a representative messaging flow that may be used in connection with the present invention.

FIG. 2 illustrates a representative messaging flow 200 that may be used in connection with the present invention. The messaging flow 200 describes a representative example of how a watcher can obtain presence information for one or more presentities. The example illustrates a number of network elements, networks, and standards that are part of the IMS domain 201, including a User Equipment (UE) terminal 202, a Radio Access Network (RAN) 204, a General Packet Radio Service (GPRS)/Dynamic Host Configuration Protocol (DHCP) entity 206, a P-CSCF 208, a presence server 210, and a Domain Name Server (DNS) 212. The UE 202 represents a device(s) that may include a watcher application that is desirous of obtaining presence information. The RAN 204 is a 3G network that provides mobile access to a number of core networks of both mobile and fixed origin—it is the network that bridges the radio link and the IP core network.

The GPRS/DHCP 206 represents exemplary communications standards that may be used in the IMS domain 201. GPRS is a packet-switched wireless communication standard for Global System for Mobile Communications (GSM) that mirrors the Internet model and enables seamless transition towards 3G networks. GPRS provides actual packet radio access for mobile GSM and time-division multiple access (TDMA) users, and is ideal for Wireless Application Protocol (WAP) services. However, any appropriate IP-connectivity network could be implemented other than GPRS. DHCP is an IP addressing discovery methodology that provides a mechanism through which devices, such as the UE 202, can obtain TCP/IP configuration settings automatically through the network. The UE 202 can contact a DHCP server by broadcasting a request packet on the RAN 204 to obtain its configuration parameters. The DHCP server allocates an IP address to the UE 202, and provides certain parameters. These IP addresses and configuration parameters are leased to the UE 202 rather than being statically assigned as in the case of static IP addressing, thereby reducing the work required to administer a large network. The DHCP, apart from providing the IP address for the UE, can also provide the IP address of the P-CSCF that is the first network entity that the UE contacts for accessing the IMS core network. The DNS 212 represents a name server that resolves a logical name (Fully-Qualified Domain Name; FQDN) into an IP address(es) of the corresponding Internet address. Other IP addressing discovery methodologies other than DHCP may also be used.

A SUBSCRIBE request depicted on path 214 is provided from a watcher application in the UE 202 to the P-CSCF 210, via the RAN 204 and GPRS/DHCP 206 address discovery. The SUBSCRIBE request is used to express the watcher application's interest in the target presentity's presence information, and thus identifies the target presentity in the request URI. The P-CSCF 208 forwards the SUBSCRIBE request to the presence server 210, as illustrated by path 216. The presence server 210 receives the request, and authorizes (and in some cases may also authenticate) the subscription. If the subscription is authorized, the presence server 210 responds by providing a return code of OK shown on path 218, which in turn is forwarded by the P-CSCF 208 to the UE 202 as shown on path 220. At this point, the UE 202 is watching for presence information from the target presentity.

A NOTIFY message shown on path 222 is sent by the presence server 210 to the P-CSCF 208, and then on to the UE 202 via the P-CSCF 208 as shown on path 224, in order to propagate the presence information of the target presentity. This information includes the state of the presentity and of the subscription. The NOTIFY message thus informs the watcher in the UE 202 when the presence information of the presentity to which it has subscriptions has been initiated or has subsequently changed. If the presence information was received and processed correctly, the UE 202 responds with an OK message shown on path 226, which is received and forwarded on path 228 to the presence server 210.

In accordance with conventional presence specifications and practices, the NOTIFY messages will include all presence information relating to the presentity or presentities to which the UE 202 has subscribed. For example, the existing CPIM PIDF specification specifies that the entire presence information is to be sent each time a NOTIFY message is sent. This, however, may not be desirable or practical in some environments, such as wireless networks. In such environments, sending the complete presence document when only some part of the document has changed is undesirable, largely due to the relatively limited bandwidth in wireless environments. The present invention solves this problem, and mitigates the superfluous transfer of presence information that is already available at the UE watchers.

In accordance with the present invention, presence servers provide partial notifications regarding the presentity's presence state. UE such as mobile terminals can receive these partial notifications. While presence information includes the presentity's communication means, the presentity's ability and willingness to communicate, and other attributes, only changed portions of this information is sent, thereby minimizing valuable bandwidth consumption. The present invention provides an extension to current notification specifications and any analogous notification practices, by providing for the use of partial presence notifications. The invention provides for the ability to indicate that only a portion of the presence information that has been previously received is no longer valid, and also provides better support for presence information versioning.

In one embodiment of the invention, currently existing presence specifications can still be used to provide the bulk of the presence information. Thus, all current parsers and specifications can be used, as the present invention provides an extension to existing specifications. The extension can be defined in a manner that it does not cause interoperability problems with presence implementations that do not recognize the extension. The invention also facilitates versioning, as one embodiment of the invention provides its own versioning support. This provides independence of application level protocols used to transport presence documents.

The present invention is described in connection with IMS, SIP, and the CPIM PIDF specification (draft-ieft-impp-cpim-pdif-05.txt; incorporated herein in its entirety) in order to facilitate an understanding of the invention. It will become readily apparent to those skilled in the art from the description provided herein that while the present invention is described in terms of an existing presence specification, namely the CPIM PIDF specification, the present invention is equally applicable to other presence information data formats.

FIG. 3 illustrates a representative namespace extension facilitating the use of partial notifications in accordance with the principles of the present invention. The representative namespace extension is depicted in the form of a table for purposes of facilitating an understanding of various elements and attributes associated with such an extension, and the tabular form is not intended to represent any particular data structure associated with such information. Further, the representative namespace extension is described in the context of IMS as an extension to the CPIM PIDF using eXtensible Markup Language (XML). However, the principles described herein can similarly be applied to analogous systems, presence information data formats, and programming languages.

In the exemplary embodiment of FIG. 3, the extension namespace includes various elements, including a version 300, action 308, and mode 310. The version element 300 can be used to identify the version of the entire presence document, or a single presence tuple. When used at the presence document level 302, the version parameter can provide versioning support across different application protocols, such as SIP, HTTP, etc. When used at the tuple level 304, the version parameter provides information to the watcher indicating whether the particular tuple should be updated or not. A particular example of the use of the version element, both at the document and tuple level, is subsequently provided in connection with FIG. 4.

The action element 306 can be used within a tuple to indicate an action to be taken by the client on that particular tuple. Representative values associated with the action element 306 include the removed 308, and empty 310 values. For example, the removed 308 value may indicate that the presence server no longer has the particular presence information for this tuple for whatever reason, and the client can ignore or remove the information associated with this tuple. The empty 310 value may indicate that the client is to empty the currently-stored presence information corresponding to that tuple. Any other 312 desired value can also be used to correspond to desired actions 306.

The mode attribute element 314 can be used at the document level to indicate whether the notification is for an update of a portion of the presence information, or whether the notification is to provide a complete presence state. Furthermore, attributes having standard values may be provided. To provide common behavior in the UE and to facilitate interoperability, a set of well-defined values (e.g., No_change, No_value, etc.) may be standardized as part of the extension namespace. For example, a No_change attribute can be used to indicate that the client should retain its current value that it previously received. A No_value attribute can be used to indicate that the element is available for the client, but the presence server cannot currently provide a value for it. An example of how such standard attribute values may be used is described in connection with FIG. 4 below.

Using the extension namespace and associated elements described above, notifications can be provided including only partial presence information updates. Additional, fewer, or different elements and attributes may also be associated with the partial notification extension of the present invention.

Figure 4:
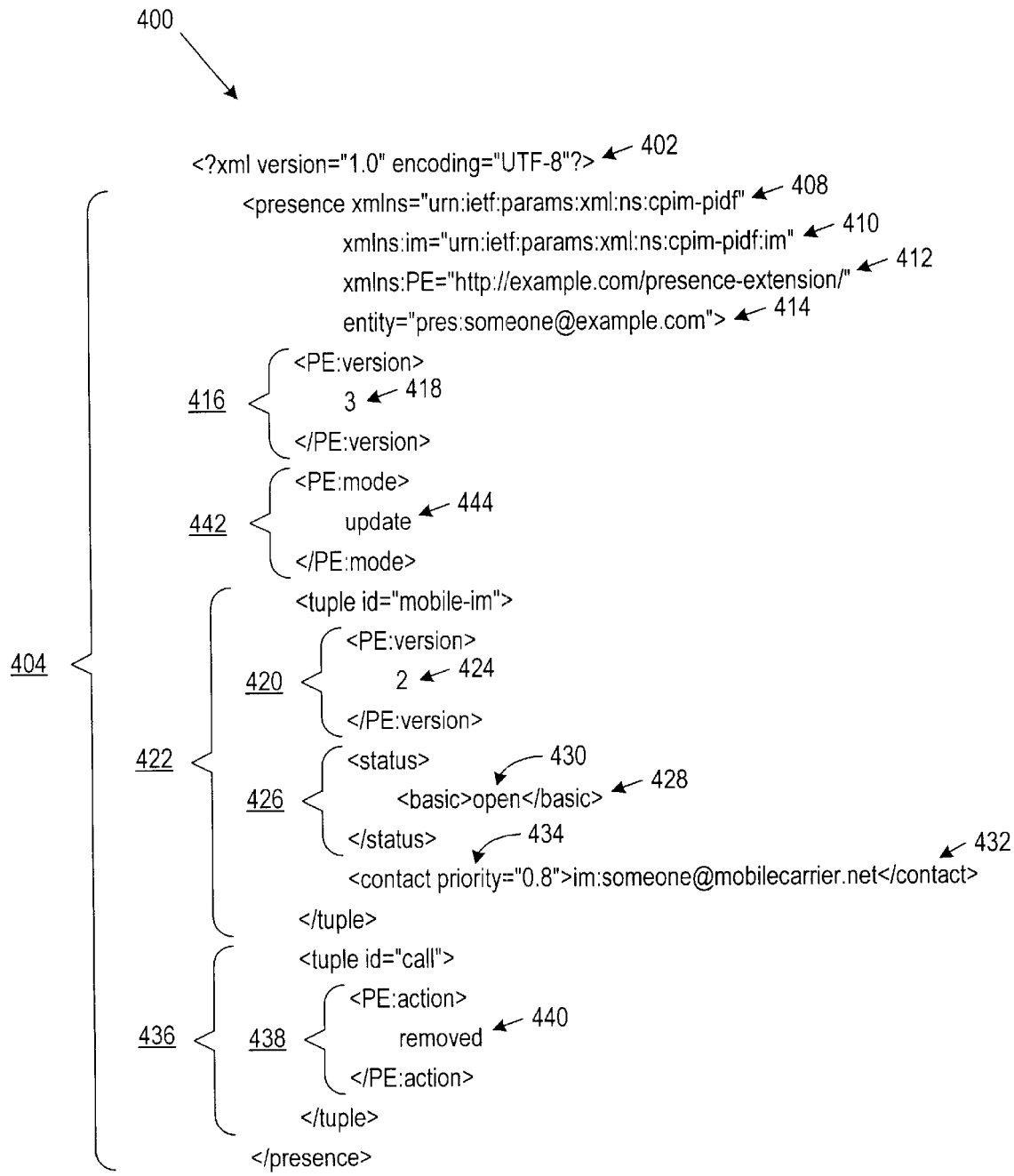
FIG. 4 illustrates a representative program segment implementing one embodiment of the namespace extension in accordance with the present invention.

FIG. 4 illustrates a representative program segment 400 implementing one embodiment of the namespace extension in accordance with the present invention. The representative program segment is described in terms of eXtensible Markup Language (XML) to illustrate an exemplary manner in which the principles of the present invention may be implemented. However, those skilled in the art will appreciate from the description provided herein that other programming languages may be used to implement such functions.

The programming segment 400 includes the XML processing instruction and encoding declaration 402. The body of the representative XML document includes the root presence element 404. This element 404 includes at least one tuple element and extension elements from other namespaces, described more fully below. The presence element 404 includes namespace declarations, including the namespace declaration 408 to indicate the namespace on which the presence document is based. The namespace declarations can include other namespace declarations for the extensions used. In the illustrated embodiment, two other namespace declarations 410, 412 are provided for the extensions used. Namespace declaration 410 relates to instant messaging, and namespace declaration 412 relates to the partial notification extension in accordance with the present invention, and is named "PE" (i.e., Presence Extension) in the illustrated embodiment. The presence element 404 also includes an entity attribute 414. Presence information is identified by a presentity or "pres" URL of the presentity. The value of the entity attribute 414 is the "pres" URL of the presentity that is publishing the presence document, which in the illustrated embodiment is someone@example.com.

In accordance with the present invention, a version element 416 is provided at the presence document level. The version element 416 can be used to identify the version of the entire presence document, where the associated version parameter 418 provides versioning support across application protocols. For example, if the presence document has a version parameter 418 of "3," this indicates that the notification is the third notification in that particular subscription. The client/watcher will have a stored version parameter that can be compared to the version parameter 418. This can be used to determine whether all tuples should be obtained from the presence server, rather than only those that might be designated specifically in the otherwise partial notification. For example, if the version parameter 418 has a value that is greater than the value stored at the client by two or more, this would indicate that the client has fallen out of synchronization with the presence server. In such a case, the client should fetch all presence tuples from the presence server.

Version elements may also be used at the tuple level, such that version parameters are provided within one or more individual presence tuples. The version element 420, which is structured within tuple element 422, includes a version parameter provided with the presence information. In this example, the version parameter has a value of "2." When used at the tuple level, the version parameter provides information to the watcher indicating whether or not the tuple should be updated. For example, the tuple 422 having an identification, id="mobile-im," includes the version element 420 having a version number 424 of "2." If this version number is higher than an existing version number stored at the client device, then the client should update this tuple, because the higher version number 424 indicates that this is a new version of information for this tuple (i.e., the information has changed).

In one embodiment of the invention where the CPIM specification and PIDF presence data format is utilized, the presence element 404 will include at least one tuple that contains a status element. Tuple 422 in FIG. 4 includes such a status element 426. The status element 426 provides certain presence status information, and the illustrated status element 426 includes a basic element 428, of which the values "open" and "closed" may be specified. These values stand for availability of receiving instant messages if the tuple is for an instant messaging address, which is the case for the exemplary tuple 422. In the illustrated embodiment, the value "open" 430 is value for the basic element 428, indicating that the presentity is available for receiving instant messages. The presence element 404 may include other elements, such as the contact element 432, which includes a URL of the contact address. The contact element 432 may include an attribute such as the "priority" attribute 434 that identifies a relative priority of the contact address over the others.

Other tuples may also be provided in the presence element 404, such as the tuple 436 having an identification, "id=call". Within this tuple 436 is another element 438, which is an action element 438 in accordance with the present invention. The action element 438, labeled "PE:action," indicates the action(s) the client should perform on the particular tuple 436. The particular value associated with the illustrated action element 438 is "removed" 440, which in accordance with one embodiment of the invention indicates to the client that the call tuple no longer has an associated value for whatever reason, and the client can ignore, remove, etc. the value. Any number of different predetermined actions may be associated with such an action element in accordance with the present invention.

The representative presence element 404 also includes a mode element 442. As previously described, a mode element in accordance with the present invention may be used at the document level to indicate that the presence notification is for an update of a portion of the presence information (i.e., a "partial notification"), or whether the notification is to provide a complete presence state. In the illustrated embodiment, the value associated with the mode element 442 is an "update" value 444, indicating a partial notification.

As previously indicated, a set of well-defined values (e.g., No_change, No_value, etc.) may be standardized as part of the extension namespace to provide common behavior in the UE and to facilitate interoperability. As an example of how such standard attribute values may be used, a presence element may include a tuple element, which in turn includes one or more attributes selected from a set of well-defined attribute values. The representative code segment below is an example of how such standard attribute values may be used.

```
<presence>
    <tuple id="886647846">
        <attribute_1>
        value_1
        </attribute_1>
        <attribute_2)
        value_2
        </attribute_2>
    </tuple>
</presence>
```

In this example, the UE already has presence information including attribute_1 having a value of "value_1" and attribute_2 having a value of "value_2." When receiving a subsequent notification, the attributes may be changed in a manner as follows:

```
<presence>
    <tuple id="886647846">
        <attribute_1>
        value_new
        </attribute_1>
        <attribute_2)
        no_change
        </attribute_2>
    </tuple>
</presence>
```

As can be seen, the UE can clearly interpret that the attribute_1 has a new value, and that the UE should retain its current value for attribute_2 because an easily recognized standard value of "no_change" has been assigned to attribute_2.

Figure 5:
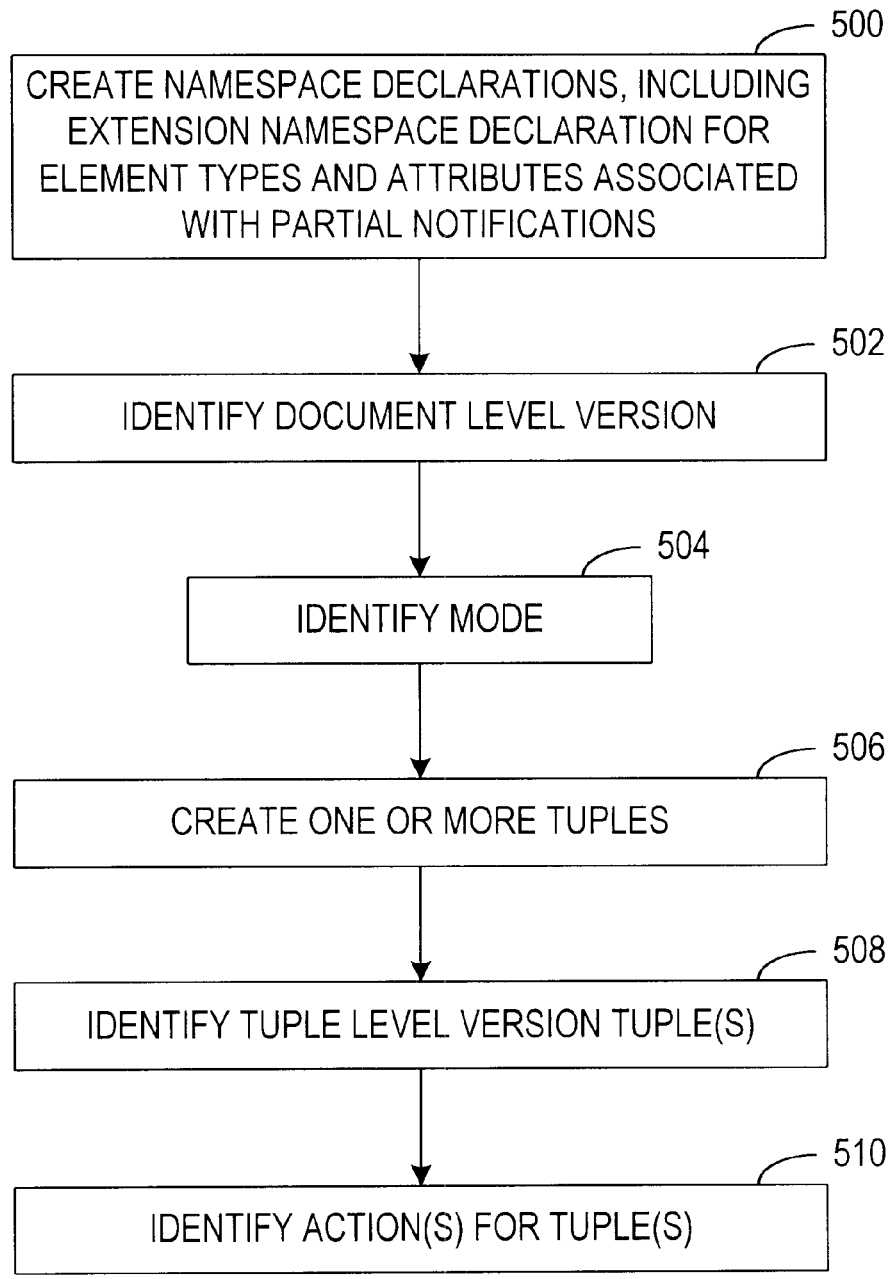
FIG. 5 is a flow diagram illustrating an exemplary embodiment for providing partial notifications to a watcher application in accordance with the invention.

FIG. 5 is a flow diagram illustrating an embodiment of a method for providing partial notifications to a watcher application in accordance with the present invention. Namespace declarations are created 500, including at least one extension namespace declaration for element types and attributes associated with partial notifications. A document-level version may be identified 502, to enable the client/watcher to determine, for example, whether it is in synchronization with the presence server. A mode may be identified 504, to indicate, for example, whether the presence notification provides a complete presence state or whether the presence notification is a partial update. One or more tuples are created 506. A tuple-level version may be identified 508 for any of these one or more tuples. An action(s) may also be identified 510 for one or more of the created tuples. When the presence document has been created, it can be sent to the appropriate watcher application in any desired manner. For example, in one embodiment of the invention, the presence document is sent to a subscribing watcher application when the associated presence information changes. Other manners, such as watcher event-triggered fetching and/or interval polling, may be used.

Figure 6:
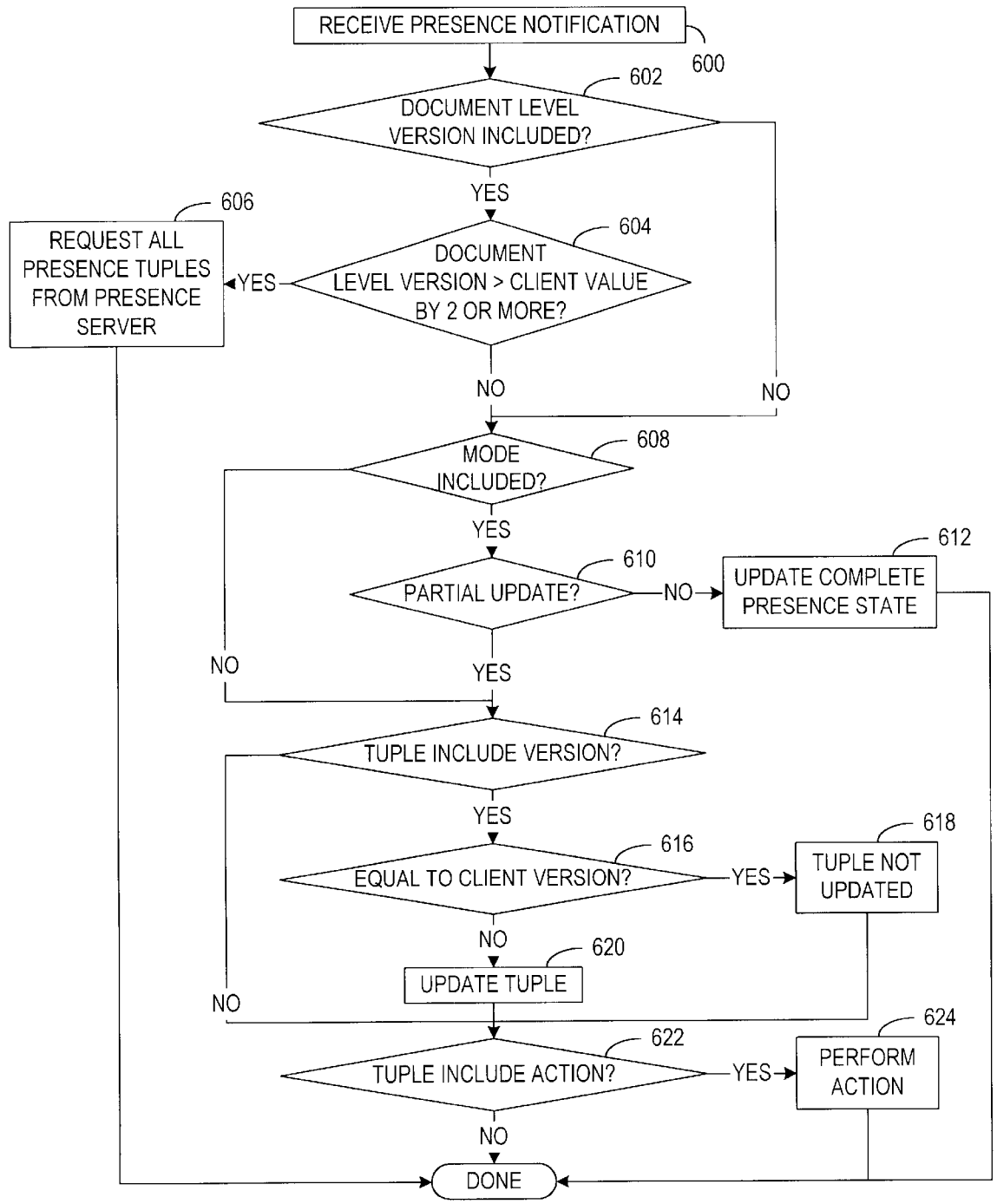
FIG. 6 is a flow diagram illustrating an exemplary embodiment of a method for processing presence information received at a client device in accordance with the present invention.

FIG. 6 is a flow diagram illustrating an exemplary embodiment of a method for processing presence information received at a client device in accordance with the present invention. The presence notification is received 600, where the presence notification may be created at a presence server or other entity in a manner such as that described in connection with FIG. 5. If a document level version is included in the presence information as determined at decision block 602, it is determined 604 whether the document level version indicates that the client is in synchronization with the presence server. In one embodiment of the invention, this is determined by comparing the document-level version with a stored value at the client, and if the document level version is greater than the client value by two or more, the client has lost synchronization with the presence server. In such a case, all of the presence tuples are requested 606 from the presence server.

If a mode is provided with the presence information as determined at decision block 608, it is determined 610 whether the mode indicates if a partial update is to be performed. If not, the complete presence state is updated 612. Otherwise, in the case of a partial update, one or more tuples may include a version value. Whether a tuple includes a tuple-level version is determined at decision block 614. If the tuple includes a tuple-level version value in accordance with the present invention, it is determined 616 whether the version has changed, which in one embodiment is ascertained by determining whether the client version is equal to the tuple-level version provided with the presence information. If the values are equal, then no change of presence information has occurred over what the client already knows, and the tuple is not updated 618. Otherwise, the tuple is updated 620. For any of the tuples, it may also be determined 622 whether the particular tuple includes an action in accordance with the present invention. If so, the action(s) is performed 624.

Figure 7:
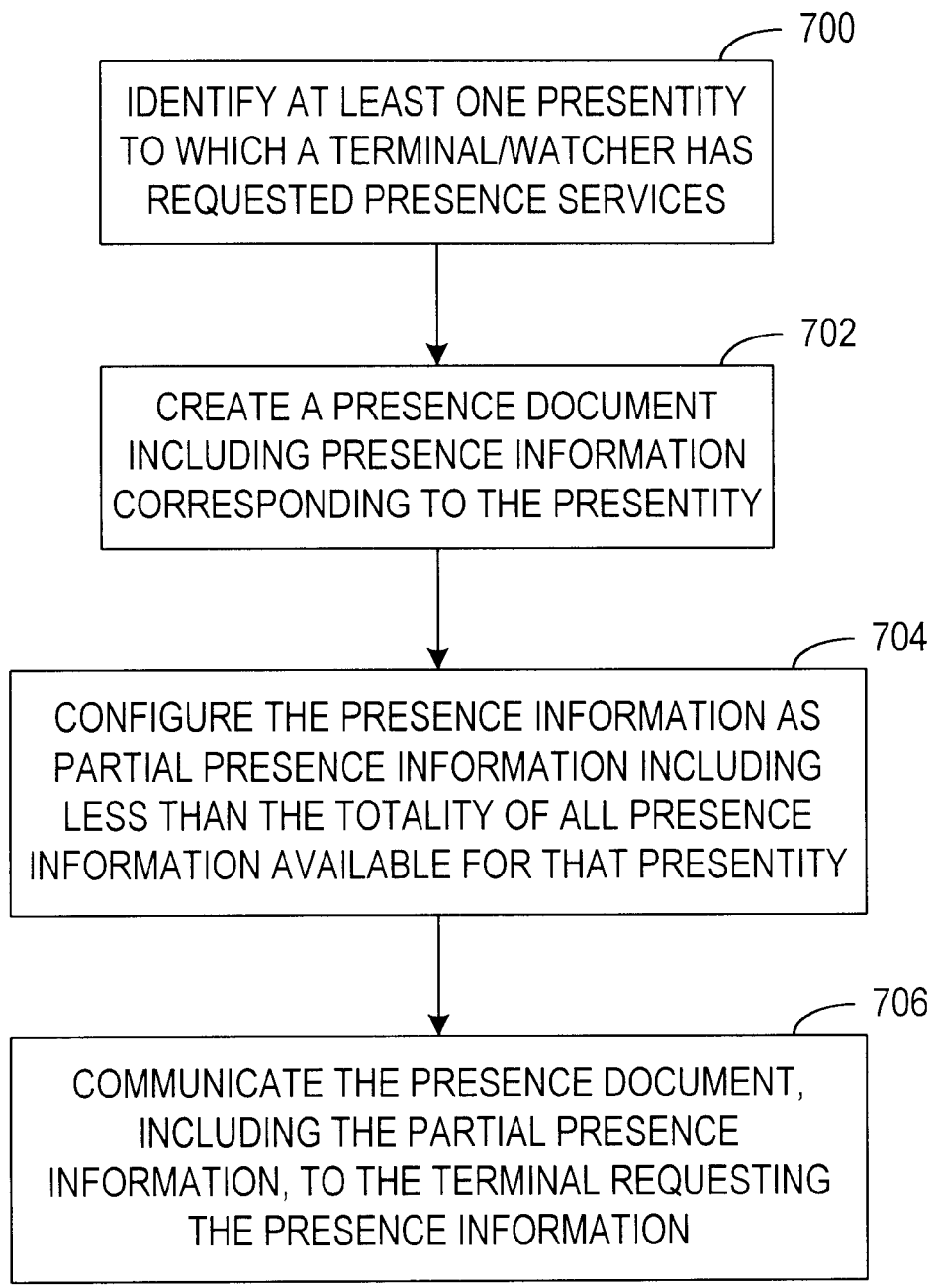
FIG. 7 is a flow diagram illustrating an exemplary embodiment of a method for communicating information between presence servers and terminals coupled to the presence servers via a network, independent of any particular interface format.

The present invention may be used in connection with different interface data formats, protocols, etc. FIG. 7 is a flow diagram illustrating an exemplary embodiment of a method for communicating information between presence servers and terminals coupled to the presence servers via a network, independent of any particular interface format. At least one presentity to which a terminal/watcher has requested presence services is identified 700. A presence document is created 702, where the presence document includes presence information corresponding to the presentity. The presence information is configured 704 as partial presence information including less than the totality of the presence information available for that presentity. The presence document, including the partial presence information, is communicated 706 to the terminal(s) that requested the presence information.

Figure 8:
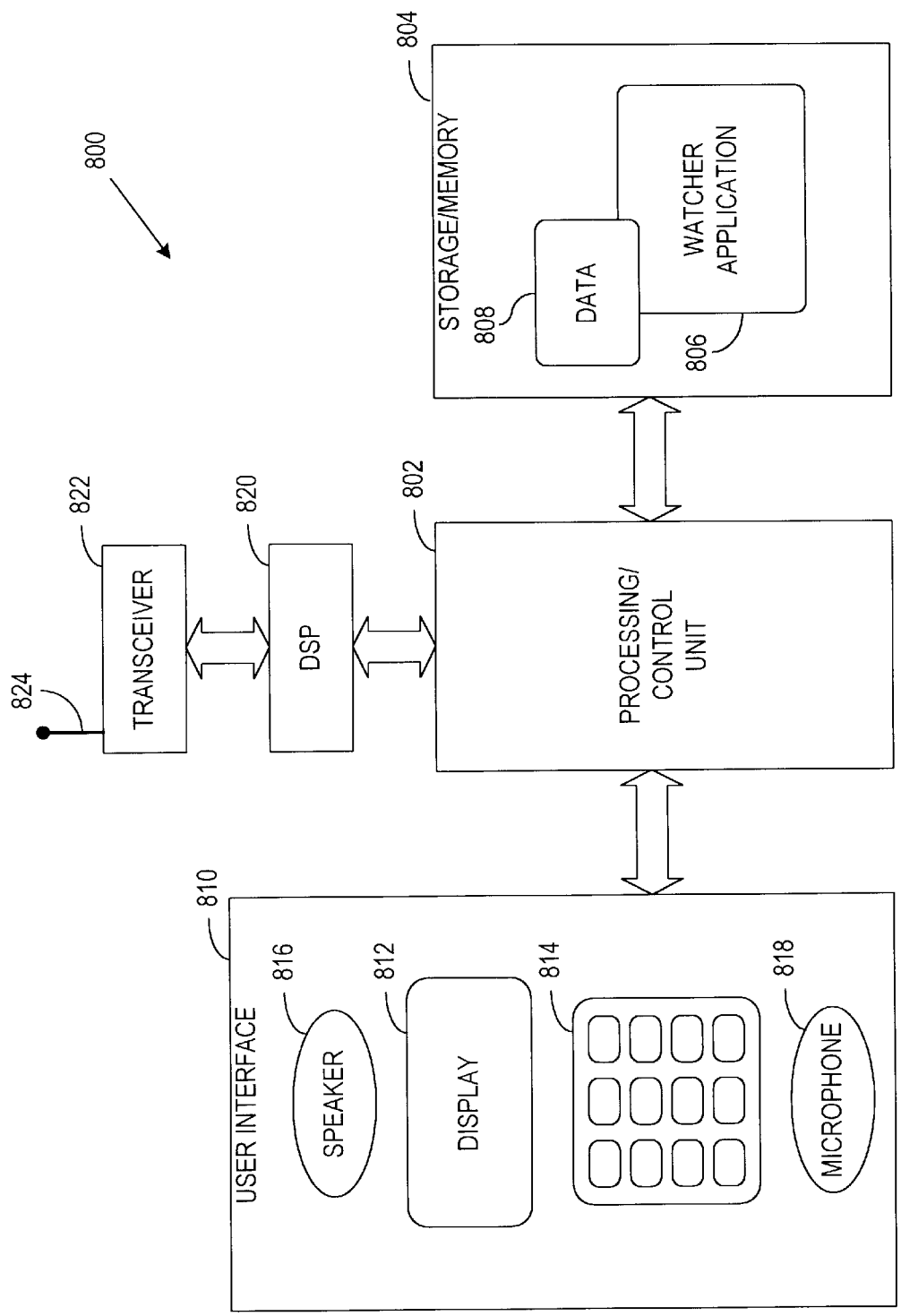
FIG. 8 illustrates an example of a representative mobile terminal computing system capable of carrying out operations in accordance with the invention.

The terminals having the watcher applications described in connection with the present invention may be any number of terminals, including desktop/personal computers, workstations, large-scale computing terminals, wireless terminals, or any other computing device capable of executing presence awareness applications. The wireless terminals include devices such as wireless/cellular telephones, personal digital assistants (PDAs), or other wireless handsets, as well as portable computing devices. The mobile terminals utilize computing components to control and manage the conventional device activity as well as the functionality provided by the present invention. Hardware, firmware, software or a combination thereof may be used to perform the various watcher application functions and associated features as described herein. For purposes of illustration and not of limitation, an example of a representative mobile terminal computing system capable of carrying out operations in accordance with the invention is illustrated in FIG. 8. It should be recognized, however, that the principles of the present invention are equally applicable to standard computing systems.

The exemplary mobile computing arrangement 800 suitable for performing the watcher application functions in accordance with the present invention includes a processing/control unit 802, such as a microprocessor, reduced instruction set computer (RISC), or other central processing module. The processing unit 802 need not be a single device, and may include one or more processors. For example, the processing unit 802 may include a master processor and associated slave processors coupled to communicate with the master processor.

The processing unit 802 controls the basic functions of the mobile terminal as dictated by programs available in the storage/memory 804. Thus, the processing unit 802 executes the functions associated with the watcher functions and associated features of the present invention. More particularly, the storage/memory 804 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 800 via data signals, such as being downloaded electronically via a network, such as the Internet.

One of the programs that may be stored in the storage/memory 804 is a watcher program 806. As previously described, the watcher program 806 can fetch and/or subscribe to presence information of one or more presentities. The watcher 806 and associated features may be implemented in software and/or firmware operable by way of the processor 802. The program storage/memory 804 may also be used to store data 808, such as the various document and tuple version values, or other data associated with the present invention. In one embodiment of the invention, the programs 806 and data 808 are stored in non-volatile electrically-erasable, programmable ROM (EEPROM), flash ROM, etc. so that the information is not lost upon power down of the mobile terminal 800.

The processor 802 is also coupled to user interface 810 elements associated with the mobile terminal. The user interface 810 of the mobile terminal may include, for example, a display 812 such as a liquid crystal display, a keypad 814, speaker 816, and microphone 818. These and other user interface components are coupled to the processor 802 as is known in the art. The keypad 814 includes alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 800 may also include a digital signal processor (DSP) 820. The DSP 820 may perform a variety of functions, including analog-to-digital (A/D) conversion, digital-to-analog (D/A) conversion, speech coding/decoding, encryption/decryption, error detection and correction, bit stream translation, filtering, etc. The transceiver 822, generally coupled to an antenna 824, transmits and receives the radio signals associated with the wireless device.

The mobile computing arrangement 800 of FIG. 8 is provided as a representative example of a computing environment in which the principles of the present invention may be applied. From the description provided herein, those skilled in the art will appreciate that the present invention is equally applicable in a variety of other currently known and future mobile computing environments. For example, the watcher application 806 and associated features, and data 808, may be stored in a variety of manners, may be operable on a variety of processing devices, and may be operable in mobile devices having additional, fewer, or different supporting circuitry and user interface mechanisms. It is noted that the principles of the present invention are equally applicable to non-mobile terminals, i.e., landline computing systems.

Figure 9:
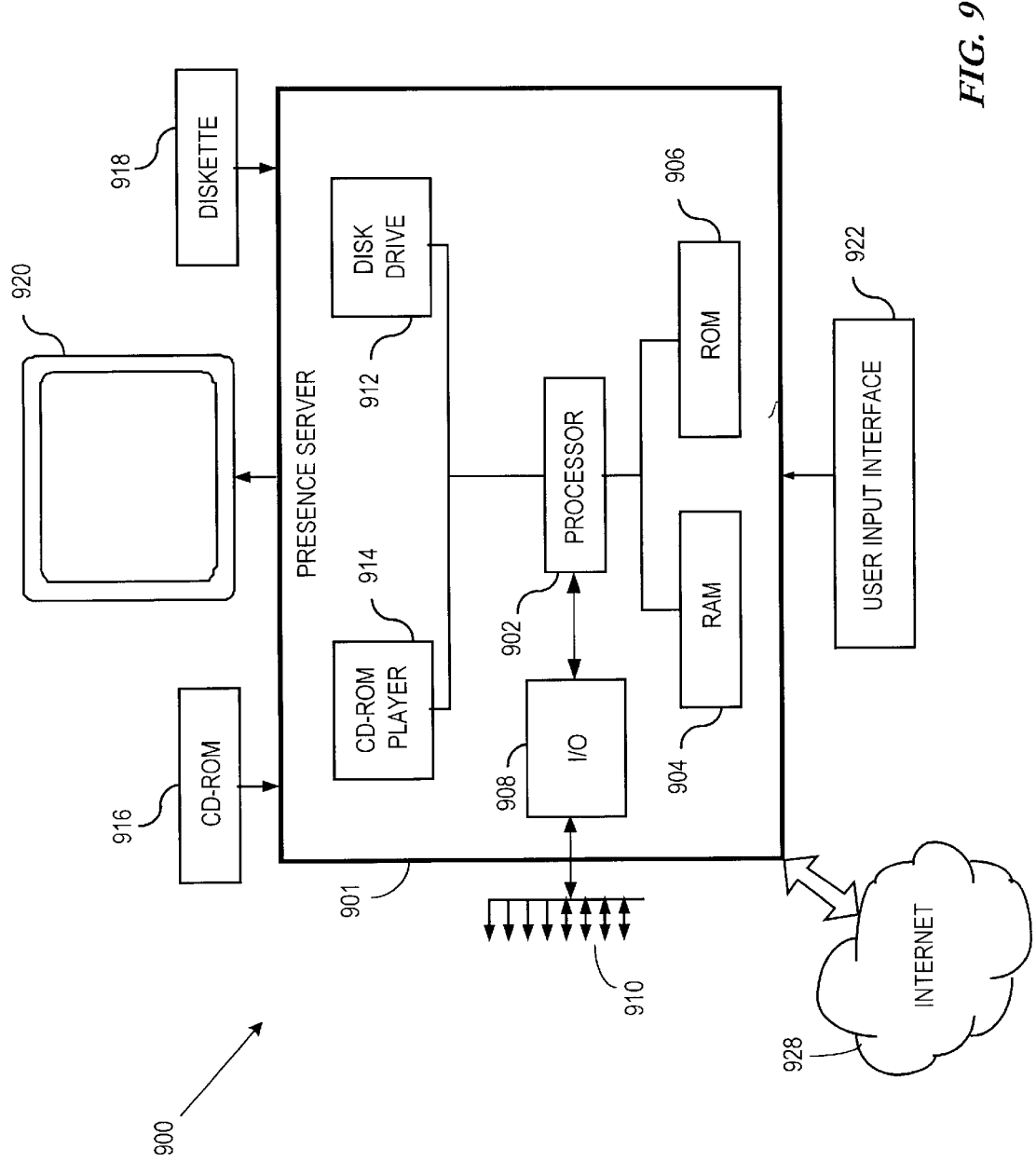
FIG. 9 illustrates an example of a representative computing system capable of supplying presence information in accordance with the invention.

The presence servers or other systems for providing presence information in connection with the present invention may be any type of computing device capable of processing and communicating presence information. The presence servers utilize computing systems to control and manage the presence awareness activity. An example of a representative computing system capable of carrying out operations in accordance with the invention is illustrated in FIG. 9. Hardware, firmware, software or a combination thereof may be used to perform the various presence awareness functions and operations described herein. The computing structure 900 of FIG. 9 is an example computing structure that can be used in connection with such a presence system.

The example computing arrangement 900 suitable for performing the presence activity in accordance with the present invention includes the presence server 901, which includes a central processor (CPU) 902 coupled to random access memory (RAM) 904 and read-only memory (ROM) 906. The ROM 906 may also be other types of storage media to store programs, such as programmable ROM (PROM), erasable PROM (EPROM), etc. The processor 902 may communicate with other internal and external components through input/output (I/O) circuitry 908 and bussing 910, to provide control signals and the like. The processor 902 carries out a variety of functions as is known in the art, as dictated by software and/or firmware instructions.

The server 901 may also include one or more data storage devices, including hard and floppy disk drives 912, CD-ROM drives 914, and other hardware capable of reading and/or storing information such as DVD, etc. In one embodiment, software for carrying out the partial presence notification operations in accordance with the present invention may be stored and distributed on a CD-ROM 916, diskette 918 or other form of media capable of portably storing information. These storage media may be inserted into, and read by, devices such as the CD-ROM drive 914, the disk drive 912, etc. The software may also be transmitted to the presence server 901 via data signals, such as being downloaded electronically via a network, such as the Internet. The server 901 is coupled to a display 920, which may be any type of known display or presentation screen, such as LCD displays, plasma display, cathode ray tubes (CRT), etc. A user input interface 922 is provided, including one or more user interface mechanisms such as a mouse, keyboard, microphone, touch pad, touch screen, voice-recognition system, etc.

The server 901 is coupled to other computing devices, such as the landline and/or wireless terminals and associated watcher applications, via a network. The server may be part of a larger network configuration as in a global area network (GAN) such as the Internet 928, which allows ultimate connection to the various landline and/or mobile client/watcher devices.

Using the description provided herein, the invention may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the invention. As such, the terms "article of manufacture" and "computer program product" as used herein are intended to encompass a computer program that exists permanently or temporarily on any computer-usable medium or in any transmitting medium which transmits such a program.

As indicated above, memory/storage devices include, but are not limited to, disks, optical disks, removable memory devices such as smart cards, SIMs, WIMs, semiconductor memories such as RAM, ROM, PROMS, etc. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links.

From the description provided herein, those skilled in the art are readily able to combine software created as described with appropriate general purpose or special purpose computer hardware to create a mobile computer system and/or computer subcomponents embodying the invention, and to create a mobile computer system and/or computer subcomponents for carrying out the method of the invention.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention not be limited with these illustrated embodiments, but rather the scope of the invention may be ascertained from the claims appended hereto.

What is claimed is:

1. A method for communicating presence information between presence servers and terminals coupled to the presence servers via a network, the method comprising:

identifying at least one presentity to which a terminal has requested presence services;

creating a presence document including presence information corresponding to the presentity;

configuring the presence information as partial presence information comprising less than a total of the presence information available for the presentity; and communicating the presence document having the partial presence information to the terminal requesting the presence information.

2. The method of claim 1, wherein configuring the presence information comprises providing status information for presence information that have changed.

3. The method of claim 1, wherein configuring the presence information comprises providing a mode value in the presence information indicative of whether the presence document includes the partial presence information or a complete update of presence information.

4. The method of claim 1, wherein configuring the presence information comprises providing at least one action value in the presence information.

5. The method of claim 1, wherein creating a presence document comprises creating a presence document conforming to a Common Profile for Instant Messaging (CPIM) specification using Presence Information Data Format (PIDF), and creating an extension to the CPIM PIDF presence document to facilitate the configuring of the presence information as partial presence information comprising less than a total of the presence information available for the presentity.

6. The method of claim 5, wherein configuring the presence information comprises providing status information for one or more presence document tuples that have experienced a status information change.

7. The method of claim 6, wherein configuring the presence information further comprises providing a tuple version indicator corresponding to a new version of the tuple that has experienced the status information change.

8. The method of claim 6, wherein configuring the presence information comprises providing at least one action value in the presence document tuples to identify an action to be taken at the terminal for the corresponding presence document tuples.

9. The method of claim 5, wherein configuring the presence information comprises providing a document version indicator to identify a document version of the presence document, wherein the document version may be used by the terminal to determine whether presence information stored at the terminal is synchronized with the presence server.

10. The method of claim 1, further comprising facilitating terminal subscription to the presence information of the at least one presentity.

11. The method of claim 10, wherein facilitating terminal subscription to the presence information comprises facilitating at least one of terminal-initiated fetching and terminal-initiated polling for the presence information.

12. The method of claim 11, wherein facilitating terminal subscription to the presence information comprises subscribing the terminal to presence information notifications initiated at the presence server.

13. The method of claim 12, wherein communicating the presence document comprises communicating the presence document when at least some of the presence information has changed.

14. The method of claim 1, further comprising recognizing a change in at least some of the presence information, and wherein communicating the presence document comprises communicating the presence document in response to a presence information change.

15. The method of claim 1, wherein communicating the presence document comprises communicating the presence document in response to at least one of an occurrence of a predetermined event, an occurrence of a predetermined time lapse, and a predetermined time.

16. The method of claim 1, wherein configuring the presence information comprises providing at least one predefined attribute value with the partial presence information.

17. A method for notifying client terminals of presence information, comprising:
   (a) creating a presence document for use by at least one terminal requesting presence information regarding a presentity, comprising:
      (i) creating at least one tuple, wherein the tuple includes a version value indicating a version of the tuple relative to previous versions of the tuple;
      (ii) associating presence information with the tuple, wherein the presence information comprises a subset of the presentity's complete set of presence information;
   (b) sending the presence document to the client terminal requesting the presence information;
   (c) comparing the version value provided via the tuple to a current version value stored on the client terminal; and
   (d) directing the client terminal to update presence information associated with the tuple, if the version value provided via the tuple indicates new presence information is available for that tuple.

18. The method of claim 17, wherein creating a presence document comprises associating the presence information with the tuple if the presence information changed relative to previous presence information.

19. The method of claim 17, wherein creating the tuple comprises including an action element with the tuple to direct the client terminal to perform a corresponding action upon execution of the tuple.

20. The method of claim 17, wherein creating the presence document further comprises creating a document-level version element including a document-level version value corresponding to a number of times in which the presence document has been sent to the client terminal.

21. The method of claim 17, wherein creating the presence document further comprises creating a mode element including a mode value indicative of whether the client device should updated with the subset of the presentity's set of presence information or whether the client device should be fully updated with the complete set of presence information.

22. The method of claim 17, wherein creating a presence document further comprises creating at least one namespace declaration corresponding to elements associated with the tuple.

23. The method of claim 17, wherein creating a presence document comprises creating a presence document otherwise conforming to the Common Profile for Instant Messaging (CPIM) specification using Presence Information Data Format (PIDF), and wherein creating a presence document further comprises creating an extension to the CPIM PIDF presence document to facilitate the configuring of the presence information as partial presence information comprising less than a total of the presence information available for the presentity.

24. A presence awareness system, comprising:
   (a) at least one terminal comprising a watcher application that watches for presence information corresponding to a presentity;
   (b) at least one presence server coupled to the at least one terminal via a network, wherein the presence server comprises a processor configured to:
      (i) identify at least one presentity to which the watcher application has requested presence services;
      (ii) create a presence document including the presence information corresponding to the presentity;
      (iii) configure the presence information as partial presence information comprising less than a total of the presence information available for the presentity;
      (iv) communicate the presence document having the partial presence information to the watcher application of the terminal requesting the presence information.

25. The presence awareness system as in claim 24, wherein the network comprises:
   a presentity presence proxy coupled to the presence server;
   a watcher presence proxy coupled to the terminal and to the presentity presence proxy; and
   wherein the presentity presence proxy and watcher presence proxy facilitates the communication of the presence document and presence information over the network.

26. A presence server coupled to a plurality of terminals via a network for communicating presence information to one or more of the plurality of terminals via the network, the presence server comprising:
   a memory configured to store presence information for a plurality of presentities, and to store terminal subscriptions for terminals authorized to receive the presence information for one or more of the presentities;
   a processing system coupled to the memory and configured to identify at least one presentity to which a particular terminal has subscribed, and to create a presence document including the presence information corresponding to the presentity, wherein the presence information is configured as partial presence information corresponding to a subset of a set of presence information available for the presentity; and
   a data transmission module coupled to the processing system to communicate the partial presence information via the presence document to the subscribing terminal over the network.

27. The presence server as in claim 26, wherein the processing system is configured to create the presence document by creating the presence document conforming to a Common Profile for Instant Messaging (CPIM) specification using Presence Information Data Format (PIDF), and by creating an extension to the CPIM PIDF presence document to facilitate the configuring of the presence information as the partial presence information.

28. The presence server as in claim 27, wherein the processing system is configured to create the extension to the CPIM PIDF presence document by providing status information for one or more presence document tuples that have experienced a status information change.

29. The presence server as in claim 28, wherein the processing system is further configured to provide a tuple version indicator corresponding to a new version of the tuple that has experienced the status information change.

30. The presence server as in claim 28, wherein the processing system is further configured to create the extension to the CPIM PIDF presence document by providing at least one action value in the presence document tuples to identify an action to be taken at the subscribing terminal for the corresponding presence document tuples.

31. The presence server as in claim 27, wherein the processing system is configured to create the extension to the CPIM PIDF presence document by providing a document version indicator to identify a document version of the presence document, wherein the document version may be used by the subscribing terminal to determine whether presence information stored at the subscribing terminal is synchronized with the presence server.

32. The presence server as in claim 26, wherein the processing system is configured to create the presence document as partial presence information by identifying within the presence document the subset of presence information that has changed relative to the presence information stored at the subscribing terminal.

\* \* \* \* \*

UNITED STATES PATENT AND TRADEMARK OFFICE
CERTIFICATE OF CORRECTION

PATENT NO. : 6,757,722 B2  
DATED : June 29, 2004  
INVENTOR(S) : Lonnfors et al.

It is certified that error appears in the above-identified patent and that said Letters Patent is hereby corrected as shown below:

Column 6,  
Line 15, "$C_X$" should read -- $C_x$ --.

Column 9,  
Lines 8 and 9, "removed" should read -- *removed* --.  
Lines 8 and 13, "empty" should read -- *empty* --.  
Line 24, "No_change, No_value," should read -- *No-change, No_value,* --.  
Line 25, "No_change," should read -- *No_change* --.  
Line 27, "No_value" should read -- *No_value* --.

Column 11,  
Line 17, "No_change, No_value," should read -- *No_change, No_value,* --.  
Line 58, "no_change," should read -- *No_change* --.

Column 17,  
Line 43, "should updated" should read -- should be updated --.

Column 18,  
Line 7, "presentity;" should read -- presentity; and --.

Signed and Sealed this

Thirty-first Day of August, 2004

JON W. DUDAS  
*Director of the United States Patent and Trademark Office*